US011551585B2

(12) United States Patent
Liu (10) Patent No.: US 11,551,585 B2
(45) Date of Patent: Jan. 10, 2023

(54) DISPLAY-SCREEN STRETCH AND RETRACTION DRIVING MECHANISM AND ELECTRONIC APPARATUS

(71) Applicant: BEIJING XIAOMI MOBILE SOFTWARE CO., LTD., Beijing (CN)

(72) Inventor: Zhenhua Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/328,756

(22) Filed: May 24, 2021

(65) Prior Publication Data

US 2022/0180777 A1 Jun. 9, 2022

(30) Foreign Application Priority Data

Dec. 7, 2020 (CN) .................. 202011438597.X (51) Int. Cl.
*G09F 9/30* (2006.01)
*G06F 1/16* (2006.01)

(52) U.S. Cl.
CPC ............ *G09F 9/301* (2013.01); *G06F 1/1652* (2013.01)

(58) Field of Classification Search
CPC ................. G09F 9/301; G06F 1/1652; G06F 2203/04102
See application file for complete search history.

(56) References Cited

U.S. PATENT DOCUMENTS

| 10,742,784 | B1 | 8/2020 | Jo et al. | |
| 10,827,052 | B1 * | 11/2020 | Han | .................. G09F 9/301 |
| 10,831,242 | B1 * | 11/2020 | He | .................. G06F 1/1652 |
| 2013/0058063 | A1 * | 3/2013 | O'Brien | .................. G06F 1/1624 |
| | | | | 361/807 |

(Continued)

FOREIGN PATENT DOCUMENTS

| CN | 109257472 A | | 1/2019 |
| CN | 113851042 A | * | 12/2021 |
| EP | 3726332 A1 | | 10/2020 |

OTHER PUBLICATIONS

European Patent Application No. 21176325.5 extended Search and Opinion dated Nov. 24, 2021, 16 pages.

(Continued)

*Primary Examiner* — Joe H Cheng
(74) *Attorney, Agent, or Firm* — Lathrop GPM LLP (57) ABSTRACT

A display-screen stretch and retraction driving mechanism and an electronic apparatus are provided. The electronic apparatus has a flexible display screen. The flexible display screen includes a first end and a second end arranged opposite to each other. The mechanism includes a housing, a driving assembly and a movable assembly. The housing is configured to be connected to the first end. The driving assembly includes a driving portion connected with the housing, and a movable portion in transmission connection with the driving portion. The movable portion is configured to move relative to the driving portion. The movable assembly is in transmission connection with the movable portion and connected with the flexible display screen. The movable assembly is configured to be driven by the driving assembly to drive the second end to move away from or close to the first end.

17 Claims, 6 Drawing Sheets

(56) References Cited

U.S. PATENT DOCUMENTS

| | | | |
|---|---|---|---|
| 2014/0194165 A1* | 7/2014 | Hwang | G06F 1/1652 |
| | | | 455/566 |
| 2016/0100478 A1* | 4/2016 | Lee | G06F 1/1624 |
| | | | 361/749 |
| 2017/0344073 A1* | 11/2017 | Kang | G06F 1/1652 |
| 2017/0357287 A1* | 12/2017 | Yang | G02F 1/133305 |
| 2019/0297736 A1* | 9/2019 | Xu | G06F 1/1656 |
| 2020/0135064 A1 | 4/2020 | Lee et al. | |
| 2020/0264660 A1* | 8/2020 | Song | G06F 1/1686 |
| 2020/0267247 A1 | 8/2020 | Song et al. | |
| 2021/0181801 A1* | 6/2021 | Yin | H04M 1/0237 |
| 2022/0183167 A1* | 6/2022 | Liu | H05K 5/0217 |

OTHER PUBLICATIONS

European Patent Application No. 21176325.5 extended Search and Opinion dated Mar. 29, 2022, 14 pages.

\* cited by examiner

DISPLAY-SCREEN STRETCH AND RETRACTION DRIVING MECHANISM AND ELECTRONIC APPARATUS

CROSS-REFERENCE TO RELATED APPLICATION

The present disclosure is based upon and claims priority to Chinese Patent Application No. 202011438597. X, filed on Dec. 7, 2020, the entire contents of which is incorporated herein by reference.

TECHNICAL FIELD

The present disclosure relates to a technical field of electronic apparatuses, and more particularly to a display-screen stretch and retraction driving mechanism and an electronic apparatus.

BACKGROUND

The market for flexible display screens is expected to grow significantly over the next few years. Deformation characteristics of the flexible display screen enrich usage states of an electronic apparatus. For example, the flexible display screen may be configured as a stretchable display screen. In the electronic apparatus with the stretchable display screen, a stretched state and a retracted state may be realized by the stretchable display screen, in which a display-screen stretch and retraction driving mechanism is a design difficulty.

SUMMARY

Embodiments of a first aspect of the present disclosure provide a display-screen stretch and retraction driving mechanism for an electronic apparatus. The electronic apparatus has a flexible display screen, and the flexible display screen includes a first end and a second end arranged opposite to each other. The display-screen stretch and retraction driving mechanism includes: a housing configured to be connected to the first end of the flexible display screen; a driving assembly including a driving portion connected with the housing, and a movable portion in transmission connection with the driving portion, the movable portion being configured to move relative to the driving portion; and a movable assembly in transmission connection with the movable portion and connected with the flexible display screen, the movable assembly being configured to be driven by the driving assembly to drive the second end of the flexible display screen to move away from or close to the first end of the flexible display screen.

Embodiments of a second aspect of the present disclosure further provide an electronic apparatus, which includes a flexible display screen and a display-screen stretch and retraction driving mechanism. The flexible display screen includes a first end and a second end arranged opposite to each other. The display-screen stretch and retraction driving mechanism includes: a housing configured to be connected to the first end of the flexible display screen; a driving assembly including a driving portion connected with the housing, and a movable portion in transmission connection with the driving portion, the movable portion being configured to move relative to the driving portion; and a movable assembly in transmission connection with the movable portion and connected with the flexible display screen, the movable assembly being configured to be driven by the driving assembly to drive the second end of the flexible display screen to move away from or close to the first end of the flexible display screen.

BRIEF DESCRIPTION OF THE DRAWINGS

The accompanying drawings, which are incorporated in and constitute a part of this specification, illustrate embodiments consistent with the present disclosure and, together with the description, serve to explain the principles of the invention.

DETAILED DESCRIPTION

Illustrative embodiments of the present disclosure will be described in details herein, and the examples thereof are illustrated in the accompanying drawings. When the description below concerns the drawings, the same numbers in different drawings represent the same or similar elements unless indicated otherwise. In the following illustrative embodiments, the embodiments illustrated do not represent all the embodiments consistent with the present disclosure. Instead, they are merely examples of devices and methods consistent with some aspects of the present disclosure as detailed in the appended claims.

The terms used in the present disclosure are merely for the purpose of describing specific embodiments, which are not intended to limit the present disclosure. Unless defined otherwise, the technical or scientific terminologies used in the present disclosure shall be the general meaning understood by those skilled in the related art of the present disclosure. Terms such as "one" or "a" used in the descriptions or the appended claims do not refer to a quantity limitation, but indicate that there exists at least one. Unless specified otherwise, terms such as "comprise" or "include" or the like mean that an element or an object presented before "comprise" or "include" contain an element or an object presented after "comprise" or "include" and its equivalents, but other elements or objects are not excluded. The terms "mounted," "connected," or the like are not restricted to physical or mechanical connections, may also be electrical connections, no matter direct or indirect. As used in the descriptions and the appended claims of the present disclosure, "a," "said" and "the" in a singular form intend to include a plural form, unless clearly indicated in the context otherwise. It should also be understood that, the term "and/or" used herein contains any and all possible combinations of one or more associated listed items.

Embodiments of the present disclosure provide a display-screen stretch and retraction driving mechanism and an electronic apparatus. Through the display-screen stretch and retraction driving mechanism, a display screen may be switched between a stretched state and a retracted state. In order to explain an overall solution, an introduction to the display-screen stretch and retraction driving mechanism is made below in combination with a structure of the electronic apparatus.

In the embodiments of the present disclosure, the electronic apparatus includes but is not limited to: smart phones, tablet computers, desktop/laptop/handheld computers, laptops, ultra-mobile personal computers (UMPC), personal digital assistants (PDA), augmented reality (AR)/virtual reality (VR) devices. The attached drawings only use the mobile phone as an example for illustration.

Figure 1:
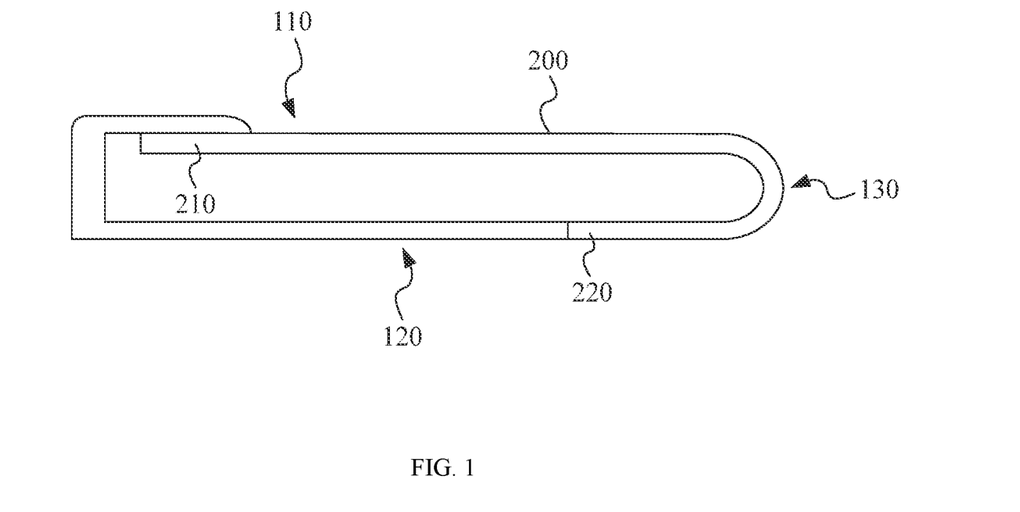
FIG. 1 is a schematic view illustrating an electronic apparatus according to an illustrative embodiment of the present disclosure.

FIG. 1 is a schematic view of an electronic apparatus according to an illustrative embodiment of the present disclosure. As illustrated in FIG. 1, the electronic apparatus has a front face 110, a rear face 120, and a side face 130. The side face 130 is connected with the front face 110 and the rear face 120. The electronic apparatus further includes a flexible display screen 200, one end of the flexible display screen 200 is fixed to the front face 110 of the electronic apparatus and the other end of the flexible display screen 200 extends to the rear face 120 of the electronic apparatus via the side face 130 of the electronic apparatus. As such, the flexible display screen 200 is continuously distributed on the front face 110, the side face 130 and the rear face 120 of the electronic apparatus.

Figure 2:
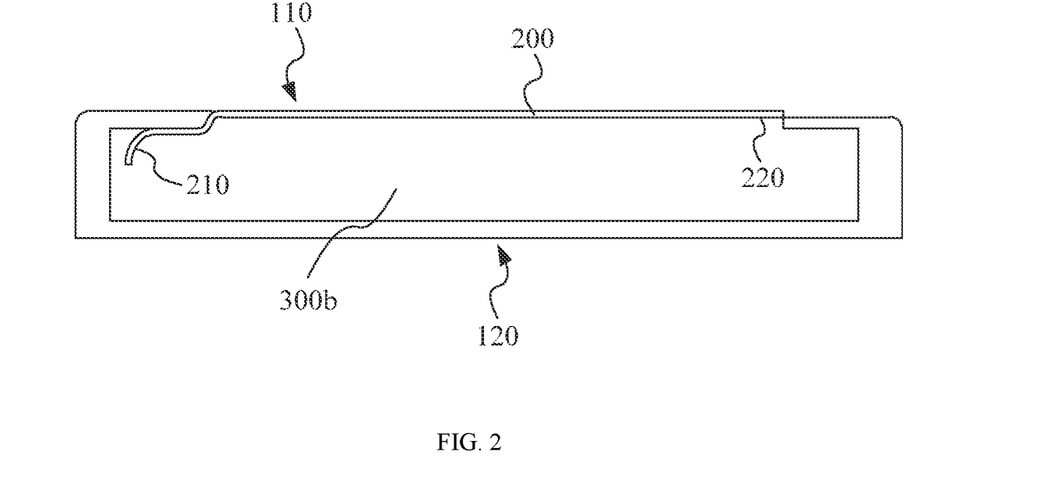
FIG. 2 is a schematic view illustrating an electronic apparatus according to another illustrative embodiment of the present disclosure.

When in use, the electronic apparatus has two usage states, namely the stretched state and the retracted state. As illustrated in FIG. 2, in the stretched state, a part of the flexible display screen 200 located at the rear face 120 of the electronic apparatus is turned over via the side face 130 to the front face 110 of the electronic apparatus to increase a size of the display screen on the front face 110 of the electronic apparatus. In the retracted state, a part of the flexible display screen 200 located at the front face 110 of the electronic apparatus is turned over via the side face 130 to the rear face 120 of the electronic apparatus to reduce the size of the display screen on of the front face 110 of the electronic apparatus.

FIG. 2 is a schematic view of an electronic apparatus according to another illustrative embodiment of the present disclosure. As illustrated in FIG. 2, a part of the flexible display screen 200 is arranged inside the electronic apparatus, and another part of the flexible display screen 200 is arranged at the front face 110 of the electronic apparatus. In the stretched state, the part of the flexible display screen 200 arranged inside the electronic apparatus is stretched out of the electronic apparatus to increase the size of the display screen on of the front face 110 of the electronic apparatus. In the retracted state, the part of the flexible display screen 200 arranged at the front face 110 of the electronic apparatus is retracted into the electronic apparatus to reduce the size of the display screen on of the front face 110 of the electronic apparatus.

Based on the above electronic apparatus, the embodiments of the present disclosure provide a display-screen stretch and retraction driving mechanism, which is configured to stretch or retract the flexible display screen 200, so as to realize the switching between different usage states of the electronic apparatus.

Figure 3:
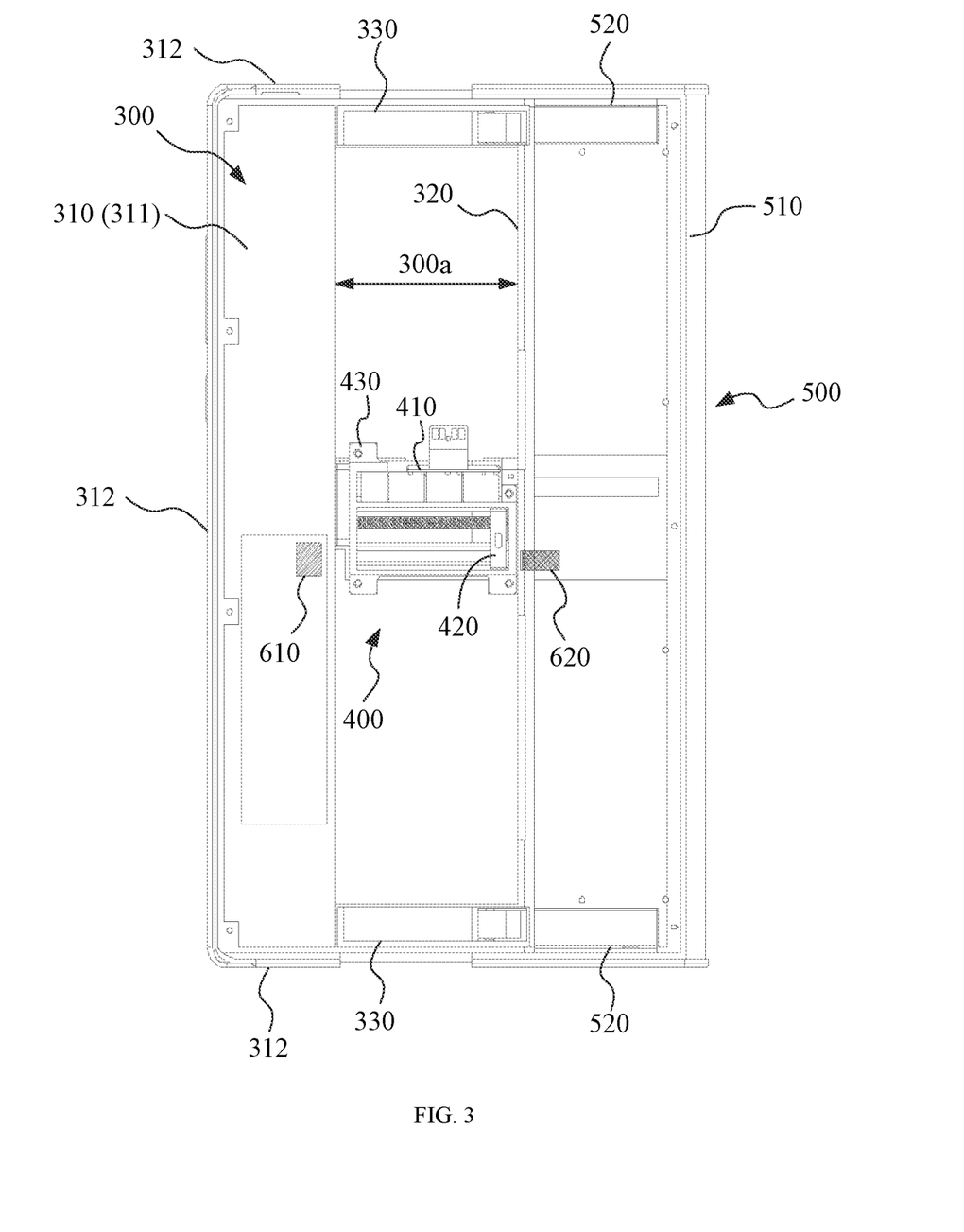
FIG. 3 is a schematic view illustrating a display-screen stretch and retraction driving mechanism according to an illustrative embodiment of the present disclosure, in which a flexible display screen is removed.

FIG. 3 is a schematic view of a display-screen stretch and retraction driving mechanism according to an illustrative embodiment of the present disclosure. As illustrated in FIG. 3, the display-screen stretch and retraction driving mechanism includes a housing 300, a driving assembly 400 and a movable assembly 500.

The housing 300 is configured to be connected to a first end 210 of the flexible display screen 200. In some embodiments of the present disclosure, the housing 300 is a middle frame of the electronic apparatus. Moreover, in combination with the two cases illustrated in FIG. 1 and FIG. 2, the housing 300 may be implemented in different ways.

In an example, referring to FIGS. 1 and 3, the housing 300 includes a first side portion 310 and a second side portion 320 arranged opposite to each other, and a space region 300a is arranged between the first side portion 310 and the second side portion 320. The driving assembly 400 is arranged in the space region 300a, and is connected with the first side portion 310 and the second side portion 320. In some embodiments of the present disclosure, the housing 300 may further include other two opposite side portions connected between the first side portion 310 and the second side portion 320 and substantially perpendicular to the first side portion 310 and the second side portion 320. The other two opposite side portions may be spaced apart from each other, and the driving assembly 400 may be also arranged between the other two side portions.

The second side portion 320 is arranged between the driving assembly 400 and the movable assembly 500, and configured to abut with a part of the movable assembly 500 when the electronic apparatus is in the retracted state. The first side portion 310 protrudes downwards beyond the second side portion 320 and is configured to abut with another part of the movable assembly 500 when the electronic apparatus is in the retracted state.

In an example, referring to FIGS. 2 and 3, the housing 300 defines an accommodation cavity 300b, a part of the flexible display screen 200 close to the first end 210 is arranged in the accommodation cavity 300b, and other parts of the flexible display screen 200 extend out of the accommodation cavity 300b onto the front face 110 of the electronic apparatus. The driving assembly 400 is arranged in the accommodation cavity 300b and is fixed relative to the housing 300 (for example, being fixedly connected with the housing 300 through a connector).

It should be noted that the electronic apparatuses illustrated in FIGS. 1 and 2 may have the same driving assembly 400, and FIG. 3 mainly illustrates the same driving assembly 400, and does not illustrate other possible differences in detail between the electronic apparatuses in FIGS. 1 and 2.

Continuing to refer to FIG. 3, the driving assembly 400 includes a driving portion 410, a movable portion 420, and a bracket 430. The driving portion 410 is connected with the housing 300. For example, the bracket 430 is connected with the housing 300, and the driving portion 410 is mounted on the bracket 430. The movable portion 420 is in transmission connection with the driving portion 410, and the movable portion 420 may move relative to the driving portion 410. In such a way, under a driving action of the driving portion 410, the movable portion 420 has a moving stroke away from or close to the housing 300. Further, the expression "in transmission connection" may be interpreted as being connected via a mechanical transmission, such as a gear transmission, a worm-gear transmission, a spline transmission, a screw transmission, and so on. That is, power and movements can be transmitted between the two in transmission connection with each other.

Figure 4:
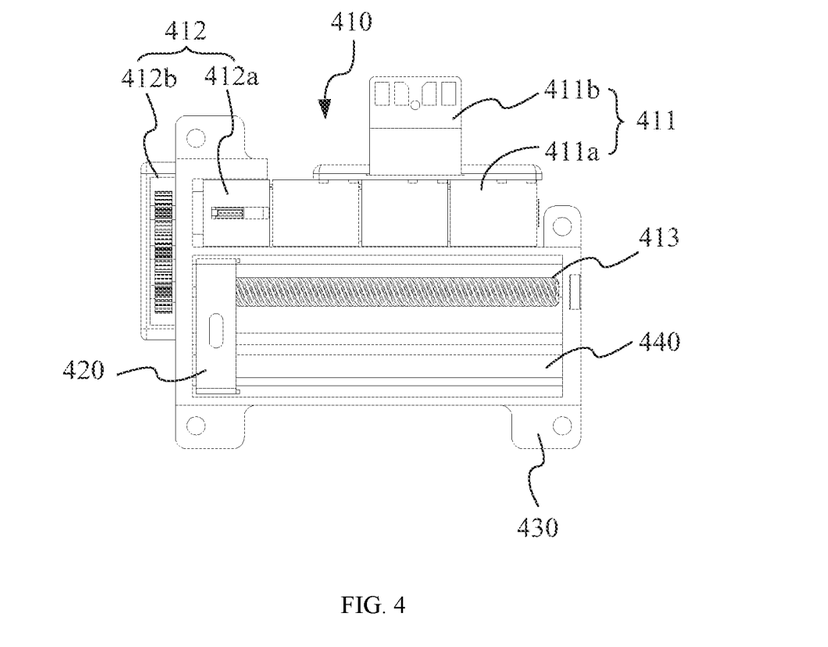
FIG. 4 is a schematic view illustrating a driving assembly according to an illustrative embodiment of the present disclosure.

FIG. 4 is a schematic view illustrating a driving assembly 400 according to an illustrative embodiment of the present disclosure. As illustrated in FIG. 4, the driving portion 410 includes a driving piece 411, a decelerating piece 412, and a transmission piece 413.

The driving piece 411 includes at least one driving motor 411a and a circuit board 411b electrically connected with the driving motor 411a. The circuit board 411b is configured to electrically connect the driving motor 411a with a control assembly (such as a control chip) to realize a controllable arrangement of the driving motor 411a. The driving motor 411a may be a DC stepping motor. In this case, the driving motor 411a converts an electric pulse signal into an angular displacement or a linear displacement. Thus, the driving motor 411a is controlled by the pulse signal to rotate by a fixed angle in a preset direction, and the angular displacement is controlled by controlling the number of pulses, so as to achieve the purpose of accurate positioning. Moreover, a rotation speed and an acceleration speed of the driving motor 411a are controlled by controlling a pulse frequency, so as to achieve the purpose of speed regulation and input a torque for rotation.

The decelerating piece 412 is connected with the driving piece 411. In some embodiments of the present disclosure, the decelerating piece 412 is fixedly connected with an output shaft of the driving motor 411a. The decelerating piece 412 is further connected with the transmission piece 413 to realize the rotation of the transmission piece 413 at a speed lower than a rotation speed directly output by the driving piece 411. In some embodiments of the present disclosure, the decelerating piece 412 includes a first decelerating unit 412a and a second decelerating unit 412b meshed with each other. Two stages of deceleration are realized by the first deceleration unit 412a and the second deceleration unit 412b, so as to convert a low torque of the driving piece 411 into a high torque.

Figure 5:
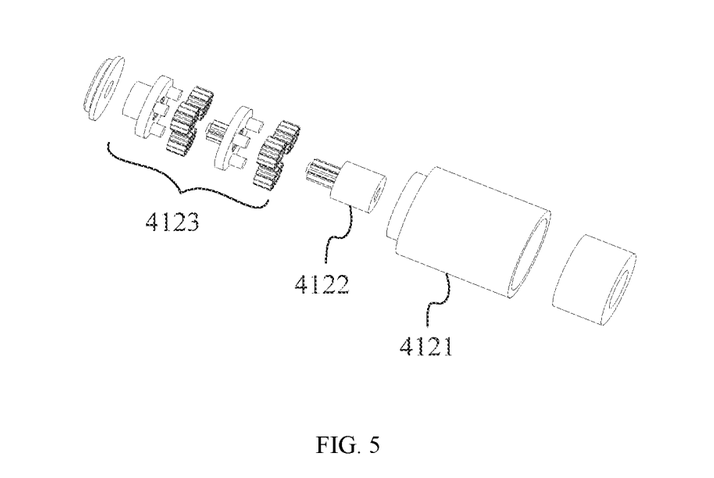
FIG. 5 is an exploded view illustrating a first deceleration unit in a decelerating piece according to an illustrative embodiment of the present disclosure.

FIG. 5 is an exploded view illustrating a first deceleration unit in a decelerating piece according to an illustrative embodiment of the present disclosure. As illustrated in FIG. 5, the first decelerating unit 412a includes a fixed member 4121, as well as a motor gear 4122 and a decelerating gear group 4123 mounted in the fixed member 4121.

Combined with FIG. 4, the fixed member 4121 includes, but is not limited to, a fixed gear ring, through which a shell of the first decelerating unit 412a is formed. One end of the motor gear 4122 is fixedly connected with the driving motor 411a directly, and the other end of the motor gear 4122 is provided with a transmission gear to be meshed with the decelerating gear group 4123. The decelerating gear group 4123 is a core component of the first decelerating unit 412a, and configured to achieve a function of rotation adjustment. In embodiments of the present disclosure, the decelerating gear group 4123 includes, but is not limited to, at least one planetary gear. Moreover, the decelerating gear group 4123 is further connected with the second decelerating unit 412b. In addition, a bushing is arranged between the motor gear 4122 and the driving motor 411a, and another bushing is arranged between the decelerating gear group 4123 and the second decelerating unit 412b.

In this way, the driving motor 411a drives the motor gear 4122 to rotate, the motor gear 4122 drives the decelerating gear group 4123 to rotate, and then the decelerating gear group 4123 drives the second decelerating unit 412b to rotate, so as to further drive the transmission piece 413 to move.

Continuing to refer to FIG. 4, the transmission piece 413 is connected with the decelerating piece 412 and is configured to be in transmission connection with the movable portion 420. In some embodiments of the present disclosure, the transmission piece 413 is a screw rod meshed with the decelerating piece 412, and the transmission piece 413 is rotatably connected with the bracket 430. In this case, the transmission piece 413 is driven to rotate relative to the bracket 430 by the decelerating piece 412. Moreover, the movable portion 420 is fitted over the transmission piece 413 and is threadedly connected with the transmission piece 413. In addition, the driving assembly 400 further includes a guide portion 440 arranged in parallel with the transmission piece 413, and the movable portion 420 is also fitted over the guide portion 440. Through the guide portion 440, the movable portion 420 is limited to move linearly along the guide portion 440, such that the movable portion 420 drives the movable assembly 500 to move linearly.

Figure 6:
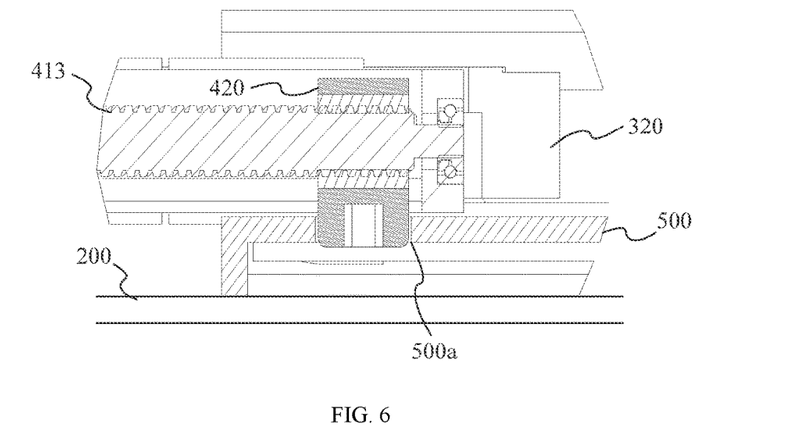
FIG. 6 is a partial sectional view illustrating a display-screen stretch and retraction driving mechanism illustrated according to an illustrative embodiment of the present disclosure.

Continuing to refer to FIG. 3, the movable assembly 500 is connected with the movable portion 420 in the driving assembly 400. FIG. 6 is a partial sectional view illustrating a display-screen stretch and retraction driving mechanism according to an illustrative embodiment of the present disclosure. As illustrated in FIG. 6, a slot 500a is formed in the movable assembly 500, and the movable portion 420 is inserted in the slot 500a. As such, the movable assembly 500 and the movable portion 420 keep synchronous linear movements.

Moreover, the movable assembly 500 is further connected with the flexible display screen 200, for example, being directly connected with the flexible display screen 200 or connected with the flexible display screen 200 through other mechanisms. The movable assembly 500 is configured to drive a second end 220 of the flexible display screen 200 to move away from or close to the first end 210 of the flexible display screen 200, under the drive of the driving assembly 400.

In this way, when the movable assembly 500 is driven by the driving assembly 400 to drive the second end 220 of the flexible display screen 200 to move away from the first end 210 of the flexible display screen 200, the flexible display screen 200 is in the stretched state. When the movable assembly 500 is driven by the driving assembly 400 to drive the second end 220 of the flexible display screen 200 to move close to the first end 210 of the flexible display screen 200, the flexible display screen 200 is in the retracted state. As such, the flexible display screen 200 may be stretched and retracted through the display-screen stretch and retraction driving mechanism, so as to switch different usage states of the electronic apparatus.

In addition, in an embodiment as illustrated in FIG. 3, the display-screen stretch and retraction driving mechanism further includes a distance detection assembly. The distance detection assembly includes a transmitter 610 and a receiver 620. One of the transmitter 610 and the receiver 620 is arranged to the housing 300, and the other one thereof is arranged to the movable assembly 500. As such, a distance between the housing 300 and the movable assembly 500 may be detected by the distance detection assembly, so as to determine the condition of stretch and retraction of the flexible display screen 200. The distance detection assembly includes, but is not limited to, an optical distance detection assembly (such as an infrared distance sensor) and a magnetic field detection assembly (such as a Hall sensor).

In the embodiments of the present disclosure, the specific structure of the display-screen stretch and retraction driving mechanism is different based on the different arrangements of the flexible display screen 200 in the electronic apparatus, which will be described in detail in combination with FIG. 1 and FIG. 2.

Figure 7A:
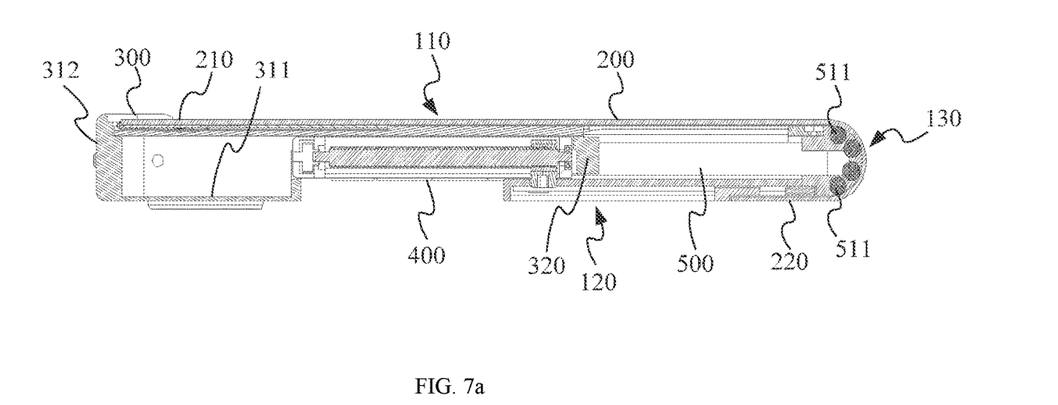
FIG. 7a is a sectional view of an electronic apparatus with a display-screen stretch and retraction driving mechanism according to an illustrative embodiment of the present disclosure, in which the electronic apparatus is in a stretched state.
Figure 7B:
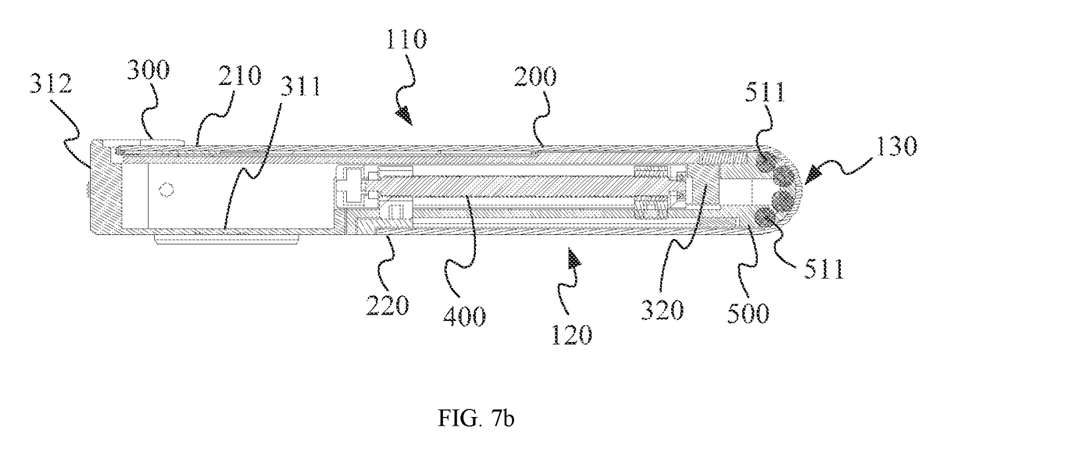
FIG. 7b is a sectional view of an electronic apparatus with a display-screen stretch and retraction driving mechanism according to an illustrative embodiment of the present disclosure, in which the electronic apparatus is in a retracted state.

In the electronic apparatus illustrated in FIGS. 1, 3, 7a and 7b, the display-screen stretch and retraction driving mechanism has a first arrangement. Specifically, the housing 300 is fixedly connected with the first end 210 of the flexible display screen 200. Optionally, the first side portion 310 includes a support wall 311 and a side wall 312 connected with the support wall 311. That is, the first side portion 310 defines a groove configured to receive components of the electronic apparatus. The support wall 311 serves as a bottom wall of the groove, and the side wall 312 serves as a side wall of the groove. In this way, the side wall 312 forms an outer edge of the electronic apparatus, and the support wall 311 is arranged inside the electronic apparatus for carrying or mounting functional modules in the electronic apparatus. For example, as illustrated in FIGS. 3, 7a and 7b, the support wall 311 has a rectangular plate-shaped structure, three side walls 312 are provided, and the three side walls 312 are arranged around three sides of the support wall 311, except a rest side of the support wall 311 where the first side portion 310 is connected to the driving assembly 400.

FIG. 7a is a sectional view of an electronic apparatus with a display-screen stretch and retraction driving mechanism according to an illustrative embodiment of the present disclosure, in which the electronic apparatus is in a stretched state. FIG. 7b is a sectional view of an electronic apparatus with a display-screen stretch and retraction driving mechanism according to an illustrative embodiment of the present disclosure, in which the electronic apparatus is in a retracted state.

As illustrated in FIG. 7a and FIG. 7b, the housing 300 is fixedly connected with the first end 210 of the flexible display screen 200. For example, the first end 210 is fixed on the support wall 311 of the housing 300 by a screen clamping strip.

The movable assembly 500 abuts against a part of the flexible display screen 200 corresponding to the side face 130 of the electronic apparatus. The movable assembly 500 is connected with the second end 220 of the flexible display screen 200. For example, the movable assembly 500 is directly connected to the second end 220 of the flexible display screen 200. In some embodiments of the present disclosure, the electronic apparatus further includes a stretch and retraction auxiliary mechanism. The stretch and retraction auxiliary mechanism is connected with the movable assembly 500 and movably connected with the second end 220 of the flexible display screen 200. An elastic piece is arranged in the stretch and retraction auxiliary mechanism. When the second end 220 moves away from the first end 210, the elastic piece stretches to apply a retraction force to the second end 220.

The stretch and retraction processes of the display screen adopting this optional arrangement are described as follows.

As illustrated in FIG. 7a, the driving assembly 400 drives the movable assembly 500 to apply an action force stretching outwards to the part of the flexible display screen 200 corresponding to the side face 130. In this case, the second end 220 of the flexible display screen 200 moves away from the first end 210 to increase the size of the flexible display screen 200 located on the front face 110 of the electronic apparatus.

As illustrated in FIG. 7b, the driving assembly 400 drives the movable assembly 500 to apply an action force retracting inwards to the part of the flexible display screen 200 corresponding to the side face 130. In this case, the second end 220 of the flexible display screen 200 moves close to the first end 210 to reduce the size of the flexible display screen 200 located on the front face 110 of the electronic apparatus.

Figure 8:
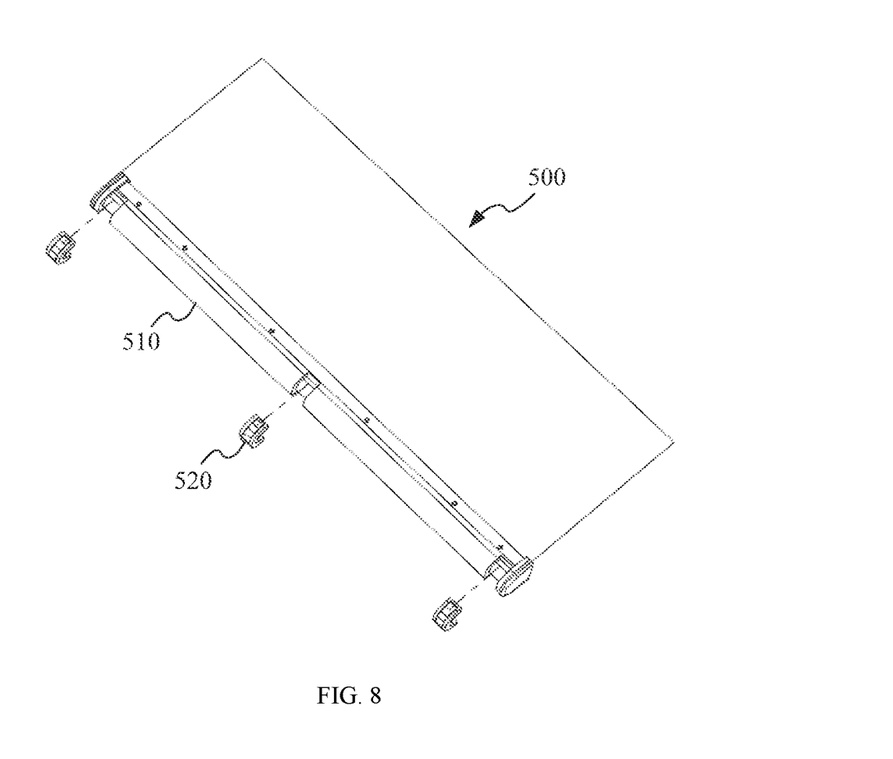
FIG. 8 is a schematic view of a display-screen stretch and retraction driving mechanism according to an illustrative embodiment of the present disclosure.

FIG. 8 is a schematic view of a display-screen stretch and retraction driving mechanism according to an illustrative embodiment of the present disclosure. As illustrated in FIG. 8, the movable assembly 500 includes an arc side portion 510 for abutting against the flexible display screen 200. Since the arc side portion 510 abuts against the flexible display screen 200, it is convenient for the flexible display screen 200 to slide relative to the movable assembly 500 on one hand, and the structural safety of the flexible display screen 200 is ensured on the other hand.

Further, as illustrated in FIGS. 7a and 7b, an abutting piece 511 is arranged to the arc side portion 510, and is in rolling connection with the flexible display screen 200. The friction between the flexible display screen 200 and the movable assembly 500 is further reduced by the rolling connection. In some embodiments of the present disclosure, the abutting piece 511 is a ball connector arranged to the arc side portion 510, and a ball of the abutting piece 511 directly contacts the flexible display screen. The number of the abutting pieces 511 is not specifically limited, for example, may be 2, 3, 4, etc. When at least two abutting pieces 511 are arranged to the arc side portion 510, the at least two abutting pieces 511 are evenly distributed along a length direction of the arc side portion 510.

Figure 9:
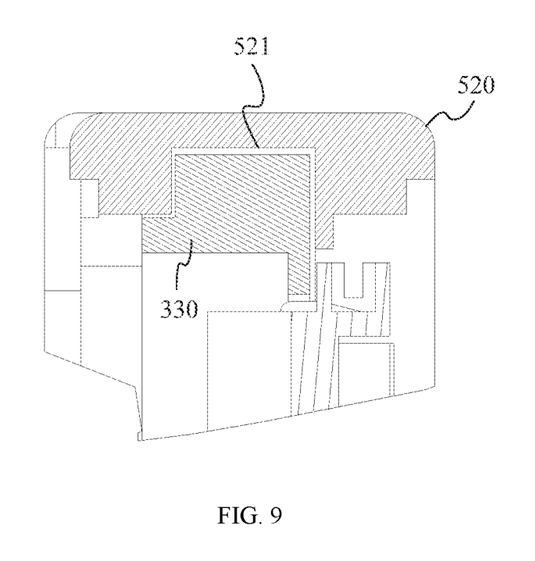
FIG. 9 is a schematic view of a display-screen stretch and retraction driving mechanism according to another illustrative embodiment of the present disclosure.

Referring again to FIG. 3, the housing 300 further includes a guide piece 330 connected to the first side portion 310 and the second side portion 320. The movable assembly 500 includes a connecting portion 520 arranged to the arc side portion 510. The guide piece 330 is movably connected with the connecting portion 520 for limiting the movable assembly 500 to move along the guide piece 330. FIG. 9 is a partial sectional view illustrating a display-screen stretch and retraction driving mechanism according to another illustrative embodiment of the present disclosure. Combined with FIG. 9, a groove 521 is formed in the connecting portion 520 along a length direction of the connecting portion 520, and the guide piece 330 is engaged in the groove 521, so as to realize the movable connection between the movable assembly 500 and the housing 300.

In the electronic apparatus illustrated in FIGS. 2 and 3, the display-screen stretch and retraction driving mechanism has a second arrangement. Specifically, the housing 300 is provided with an accommodation cavity 300b, a part of the flexible display screen 200 is arranged in the accommodation cavity 300b, and another part of the flexible display screen 200 extends out of the accommodation cavity 300b onto the front face 110 of the electronic apparatus. The movable assembly 500 is connected with the second end 220 of the flexible display screen 200.

The stretch and retraction processes of the display screen adopting this optional arrangement are described as follows.

The driving assembly 400 drives the movable assembly 500 to drive the second end 220 of the flexible display screen 200 to move away from the first end 210. In this case, the flexible display screen 200 originally located in the accommodation cavity 300b is pulled out of the accommodation cavity 300b to increase the size of the flexible display screen 200 located on the front face 110 of the electronic apparatus.

The driving assembly 400 drives the movable assembly 500 to drive the second end 220 of the flexible display screen 200 to move close to the first end 210. The flexible display screen 200 originally located on the front face 110 of the electronic apparatus retracts into the accommodation cavity 300b to reduce the size of the flexible display screen 200 located on the front face 110 of the electronic apparatus.

Based on the display-screen stretch and retraction driving mechanism provided above, the embodiments of the present disclosure further provide an electronic apparatus. The electronic apparatus includes a processor, a flexible display screen and the display-screen stretch and retraction driving mechanism provided above. The processor is electrically connected with the circuit board of the driving motor of the display-screen stretch and retraction driving mechanism, and the switch between the stretched and retracted states of the display screen is realized by controlling the driving motor.

In the stretched state, the size of the display screen on of the front face 110 of the electronic apparatus is relatively large. In the retracted state, the size of the display screen on of the front face 110 of the electronic apparatus is relatively small. Thus, a new manner for switching the states of the electronic apparatus is provided to meet the user's usage requirements.

Other embodiments of the disclosure will be apparent to those skilled in the art from consideration of the specification and practice of the disclosure disclosed here. The present disclosure is intended to cover any variations, uses, or adaptations of the invention which follow the general principles thereof and include such departures from the present disclosure as come within known or customary practice in the art. It is intended that the specification and embodiments should be considered as illustrative only, while a true scope and spirit of the present disclosure are indicated by the appended claims.

What is claimed is:

1. A display-screen stretch and retraction driving mechanism, comprising:
    a housing configured to be connected to a first end of a flexible display screen of an electronic apparatus, the flexible display screen further having a second end opposite to the first end;
    a driving assembly comprising a driving portion connected with the housing, and a movable portion in transmission connection with the driving portion, the movable portion being configured to move relative to the driving portion; and
    a movable assembly in transmission connection with the movable portion and connected with the flexible display screen, the movable assembly being configured to be driven by the driving assembly to drive the second end of the flexible display screen to move away from or close to the first end of the flexible display screen,
    wherein the housing comprises a first side portion and a second side portion arranged opposite to each other, and a space region is defined between the first side portion and the second side portion;
    the driving assembly is arranged in the space region and connected with the first side portion and the second side portion,
    wherein the driving portion comprises:
    a driving piece;
    a decelerating piece connected with the driving piece; and
    a transmission piece connected with the decelerating piece and configured to be in transmission connection with the movable portion.

2. The display-screen stretch and retraction driving mechanism according to claim 1, wherein the flexible display screen extends from a front face of the electronic apparatus to a rear face of the electronic apparatus via a side face of the electronic apparatus,
    the first end of the flexible display screen is arranged at the front face of the electronic apparatus, and the second end of the flexible display screen is movably arranged at the rear face of the electronic apparatus and connected with the movable assembly,
    the housing is fixedly connected with the first end of the flexible display screen, and the movable assembly abuts against a part of the flexible display screen corresponding to the side face of the electronic apparatus.

3. The display-screen stretch and retraction driving mechanism according to claim 2, wherein the movable assembly comprises an arc side portion for abutting against the flexible display screen.

4. The display-screen stretch and retraction driving mechanism according to claim 3, wherein the arc side portion is provided with an abutting piece, and the abutting piece is in rolling connection with the flexible display screen.

5. The display-screen stretch and retraction driving mechanism according to claim 1, wherein the housing has an accommodation cavity, the accommodation cavity is configured to accommodate a part of the flexible display screen close to the first end of the flexible display screen, and the movable assembly is connected with the second end of the flexible display screen.

6. The display-screen stretch and retraction driving mechanism according to claim 1, wherein the housing further comprises a guide piece connected with the first side portion and the second side portion, and the guide piece is configured to be movably connected with the movable assembly.

7. The display-screen stretch and retraction driving mechanism according to claim 1, wherein the decelerating piece comprises a first decelerating unit and a second decelerating unit meshed with each other, and the first decelerating unit comprises:
    a fixed member;
    a decelerating gear group mounted in the fixed member; and
    a motor gear having an end fixed connected with the driving piece and another end meshed with the decelerating gear group.

8. The display-screen stretch and retraction driving mechanism according to claim 7, wherein the decelerating gear group comprises at least one planetary gear, and the at least one planetary gear is connected with the second decelerating unit.

9. The display-screen stretch and retraction driving mechanism according to claim 1, further comprising a distance detection assembly, and the distance detection assembly comprising a transmitter and a receiver, one of the transmitter and the receiver being arranged to the housing, and the other one of the transmitter and the receiver being arranged to the movable assembly.

10. An electronic apparatus, comprising:
a flexible display screen comprising a first end and a second end arranged opposite to each other; and
a display-screen stretch and retraction driving mechanism comprising:
a housing configured to be connected to the first end of the flexible display screen;
a driving assembly comprising a driving portion connected with the housing, and a movable portion in transmission connection with the driving portion, the movable portion being configured to move relative to the driving portion; and
a movable assembly in transmission connection with the movable portion and connected with the flexible display screen, the movable assembly being configured to be driven by the driving assembly to drive the second end of the flexible display screen to move away from or close to the first end of the flexible display screen,
wherein the housing comprises a first side portion and a second side portion arranged opposite to each other, and a space region is defined between the first side portion and the second side portion;
the driving assembly is arranged in the space region and connected with the first side portion and the second side portion,
wherein the driving portion comprises:
a driving piece;
a decelerating piece connected with the driving piece; and
a transmission piece connected with the decelerating piece and configured to be in transmission connection with the movable portion.

11. The electronic apparatus according to claim 10, wherein the flexible display screen extends from a front face of the electronic apparatus to a rear face of the electronic apparatus via a side face of the electronic apparatus,
the first end of the flexible display screen is arranged at the front face of the electronic apparatus, and the second end of the flexible display screen is movably arranged at the rear face of the electronic apparatus and connected with the movable assembly,
the housing is fixedly connected with the first end of the flexible display screen, and the movable assembly abuts against a part of the flexible display screen corresponding to the side face of the electronic apparatus.

12. The electronic apparatus according to claim 11, wherein the movable assembly comprises an arc side portion for abutting against the flexible display screen.

13. The electronic apparatus according to claim 12, wherein the arc side portion is provided with an abutting piece, and the abutting piece is in rolling connection with the flexible display screen.

14. The electronic apparatus according to claim 10, wherein the housing has an accommodation cavity, the accommodation cavity is configured to accommodate a part of the flexible display screen close to the first end of the flexible display screen, and the movable assembly is connected with the second end of the flexible display screen.

15. The electronic apparatus according to claim 10, wherein the housing further comprises a guide piece connected with the first side portion and the second side portion, and the guide piece is configured to be movably connected with the movable assembly.

16. The electronic apparatus according to claim 10, further comprising a distance detection assembly, and the distance detection assembly comprising a transmitter and a receiver,
one of the transmitter and the receiver being arranged to the housing, and the other one of the transmitter and the receiver being arranged to the movable assembly.

17. A display-screen stretch and retraction driving mechanism, further comprising
a housing configured to be connected to a first end of a flexible display screen of an electronic apparatus, the flexible display screen further having a second end opposite to the first end;
a driving assembly comprising a driving portion connected with the housing, and a movable portion in transmission connection with the driving portion, the movable portion being configured to move relative to the driving portion;
a movable assembly in transmission connection with the movable portion and connected with the flexible display screen, the movable assembly being configured to be driven by the driving assembly to drive the second end of the flexible display screen to move away from or close to the first end of the flexible display screen; and
a distance detection assembly, and the distance detection assembly comprising a transmitter and a receiver, one of the transmitter and the receiver being arranged to the housing, and the other one of the transmitter and the receiver being arranged to the movable assembly.

* * * * *